United States Patent
Morimoto et al.

[11] 3,891,763
[45] June 24, 1975

[54] SYNTHETIC PENICILLINS

[75] Inventors: Shiro Morimoto, Kobe; Hiroaki Nomura, Osaka; Takeshi Fugono, Kawanishi; Kihachiro Maeda, Itami; Toshihiro Ishiguro, Osaka, all of Japan

[73] Assignee: Takeda Chemical Industries, Ltd., Osaka, Japan

[22] Filed: Dec. 7, 1973

[21] Appl. No.: 422,779

Related U.S. Application Data

[62] Division of Ser. No. 218,689, Jan. 18, 1972, which is a division of Ser. No. 862,018, Sept. 29, 1969, Pat. No. 3,660,379.

[30] Foreign Application Priority Data
Sept. 28, 1968 Japan.............................. 43-70572

[52] U.S. Cl.............................. 424/271; 424/263
[51] Int. Cl..................................... A61k 27/00
[58] Field of Search....................... 424/271, 263

[56] References Cited
UNITED STATES PATENTS
3,249,622  5/1968  Herrling et al................. 260/239.1
3,382,238  5/1968  Dolfini........................... 260/239.1

*Primary Examiner*—Jerome D. Goldberg
*Attorney, Agent, or Firm*—Wenderoth, Lind & Ponack

[57] ABSTRACT

Synthetic penicillins of the formula

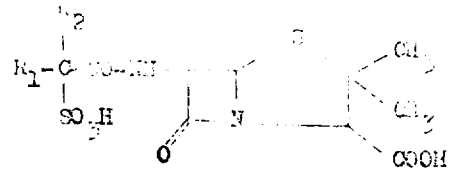

wherein $R_1$ and $R_2$ are hydrogen, alkyl, cycloalkyl, aralkyl or unsubstituted or substituted phenyl, pyridyl, naphthyl or thienyl or alternatively, $R_1$ and $R_2$ together form a polymethylene group, and pharamaceutical salts thereof, useful as antibacterial agents, and especially against Gram-positive and Gram-negative bacteria, are prepared by reacting 6-aminopenicillanic acid or a silylatyed derivative thereof with an acylating agent derived from a carboxylic acid of the formula

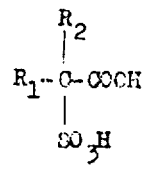

at a temperature of $-20°$ to $40°$ C in a base and inert solvent.

12 Claims, No Drawings

SYNTHETIC PENICILLINS

This is a division of application Ser. No. 218,689, filed Jan. 18, 1972, which in turn is a division of application Ser. No. 862,018, filed Sept. 29, 1969, now U.S. Pat. No. 3,660,379.

The present invention relates to the preparation of synthetic compounds useful as antibacterial agents, nutritional supplements in animal feeds, and therapeutic agents in poultry and animals. In the treatment especially of infectious diseases caused by Gram-positive and Gram-negative bacteria, more particularly it relates to the production of penicillins and pharmaceutically acceptable salts thereof.

Many penicillins have been proved effective in the therapy of the infections caused by bacteria, but these compounds suffer from at least one or more of the following drawbacks:

1. Being unstable in aqueous acid.
2. Lacking ability to effectively control Pseudomonas infections.
3. Being ineffective against so-called penicillin G-resistant strains of bacteria (e.g. many strains of *Staphylococcus aureus*).
4. Being unstable against penicillinase produced by various microorganisms.

Many of the compounds produced in accordance with the present invention, in addition to their strong activity against Gram-positive bacteria, exhibit excellent resistance to decomposition by acid or penicillinase, and particularly have significant activity against Gram-negative microorganisms such as those of the genus Pseudomonas. Accordingly, the compounds produced are unique in possessing all desirable activities.

There is provided, as a result of the process of the present invention, a synthetic penicillin represented by the general formula

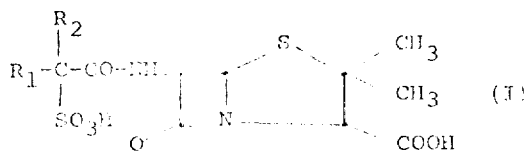

wherein each of $R_1$ and $R_2$ is hydrogen, an alkyl group, a cycloalkyl group, an aralkyl group or a substituted or unsubstituted phenyl, pyridyl, naphthyl or thienyl group, the substituent thereof being nitro, sulfo, carboxyl, halo, lower alkyl or lower alkoxy, or alternatively, $R_1$ and $R_2$ together represent a polymethylene group having four to six carbon atoms, and pharmaceutically acceptable salts thereof.

The alkyl group represented by $R_1$ and $R_2$ is an aliphatic hydrocarbon group having from one to 12 carbon atoms inclusive (e.g. methyl, ethyl, isopropyl, sec-butyl, tert-butyl, dodecyl, etc.).

The cycloalkyl group contains from three to 12 carbon atoms inclusive (e.g. cyclohexyl).

The aralkyl group is a lower aralkyl group having from seven to 10 carbon atoms inclusive (e.g. benzyl, phenethyl, etc.).

The phenyl, naphthyl, pyridyl and thienyl groups include those substituted by one or more suitable substituents such as nitro, carboxyl, sulfo, halo (e.g. F, Cl, Br, etc.), lower alkoxy of from one to six carbon atoms (e.g. methoxy, ethoxy, n-propoxy, etc.), lower alkyl of from one to six carbon atoms (e.g. methyl, ethyl, n-propyl, iso-propyl, n-pentyl, etc.) and cycloloweralkyl of from three to six carbon atoms (e.g. cyclohexyl).

The pharmaceutically acceptable salts include salts with nontoxic metals (e.g. sodium, potassium, calcium, aluminum, magnesium, etc.) and salts with amines (e.g. ammonia, triethylamine, procaine, dibenzylamine, and other amines which have been used for various known penicillins).

The synthetic penicillins are prepared conveniently by reacting 6-aminopenicillanic acid or a silylated derivative thereof with an acylating agent derived from an α-sulfocarboxylic acid represented by the general formula

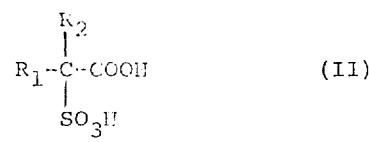

wherein $R_1$ and $R_2$ have the same meaning as defined above.

The acylating agents include acid halides (e.g. chloride, bromide, etc.) corresponding to the carboxylic acid of the general formula (II), corresponding carboxylic acid anhydrides, particularly mixed anhydrides prepared from the carboxylic acid of the general formula (II) and a stronger acid such as a lower alkyl or aralkyl monoester of carbonic acid (e.g. benzyloxycarbonic acid, ethoxycarbonic acid, etc.), an acetic acid substituted by an electron withdrawing group or groups (e.g. dichloroacetic acid, trichloroacetic acid, etc.) or an alkane- or arene-sulfonic acid (e.g. toluenesulfonic acid, methanesulfonic acid, etc.). In addition, the acylating agent also includes the corresponding acid azide or the corresponding active ester or thioester, i.e., an ester prepared from the carboxylic acid with a phenol or a thiophenol (e.g. p-nitrophenol, 2,4-dinitrophenol, pentachlorophenol, thiophenol). Furthermore the acylating agent should include the carboxylic acid coupled with N, N-dimethylchloroformiminium chloride, an N,N-carbonylditriazole, a carbodiimido reagent [e.g. N,N'-dicyclohexylcarbodiimide, N,N'-diisopropylcarbodiimide, or N-cyclohexyl-N'-(2-morpholinoethyl)-carbodiimide], a ketenimine reagent or an isoxazolium salt reagent. Another acylating agent derived from the carboxylic acid of the general formula (II) is the corresponding azolide, i.e., the corresponding acid amide whose amide nitrogen atom is a member of an aromatic five-membered ring containing at least two nitrogen atoms (e.g. imidazole, pyrazole, benzimidazole, etc.). Among these acylating agents, the acid halides, and particularly the acid chloride, are preferable, in view of their conveniency and low production cost.

The acylating agent is produced by a per se known method. For example, the corresponding acid halide is easily produced by first reacting the carboxylic acid of the general formula

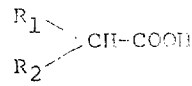

wherein $R_1$ and $R_2$ have the same meaning as defined above, with sulfur trioxide or its dioxane complex in dichloroethane at 10° to 60°C, and then treating the resultant carboxylic acid (II) with a halogenating agent (e.g. thionyl chloride, phosphorus oxychloride, phosphorus oxybromide, etc.) at 0° to 100°C, more preferably at 10° to 40°C, in the presence of a catalyst (e.g. dimethylformamide, etc.).

It should be noted that the 6-aminopenicillanic acid may be either 6-aminopenicillanic acid itself or a salt thereof. In general, it is more preferable to utilize the salt form (e.g. sodium salt, potassium salt, triethylamine salt, etc.).

As is well known, the silylated derivatives of 6-aminopenicillanic acid include mono-silyl derivatives and di-silyl derivatives; both can be employed in the method of the present invention, though the latter is preferred since it generally gives more favorable results than the former. Preferable examples of the silyl group in the silylated derivatives have the general formula

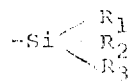

in which $R_1$, $R_2$ and $R_3$ are lower alkyl groups with from one to five carbon atoms, benzyl, phenethyl, cyclohexyl, phenyl or tolyl groups.

The acylation of the present invention is preferably performed by reacting 6-aminopenicillanic acid with an acylating agent in a suitable solvent in the presence of a suitable base.

The acylation may be conducted at room temperature, below room temperature, or even above room temperature. However, since 6-aminopenicillanic acid and its acylation products are liable to decompose at an elevated temperature, the reaction is preferably carried out at a temperature below about 50°C, and preferably from about −20°C to about 40°C to the extent that the reaction mixture retains its liquid form.

Suitable bases are organic bases (e.g. triethylamine, tributylamine, pyridine, piperidine, morpholine, etc.) and inorganic bases (e.g. sodium bicarbonate, potassium bicarbonate, sodium hydroxide, potassium hydroxide, sodium carbonate, potassium carbonate, etc.). The amount of base is generally 1 to 3 mols per mol of the acylating agent.

Any solvent which does not disturb the reaction may be employed for the acylation reaction. Such solvents are exemplified by water, dioxane, acetone, dimethylformamide, tetrahydrofuran, chloroform, ethylene dichloride, toluene, benzene, or mixtures of them. However in the case where the silylated derivatives are employed, it is recommended that an inert solvent (e.g. ether, dioxane, benzene, tetrahydrofuran, chloroform, etc.) be utilized.

It should be noted that hydrolysis or alcoholysis of an acylation product produced by the reaction of an acylating agent and a silylated derivative of 6-aminopenicillanic acid is performed by merely treating the acylation product with water or a lower aliphatic alcohol (e.g. methanol, ethanol, etc.) so as to obtain the compound of the general formula (I).

After the reaction, the objective compound of the present invention is recovered from the reaction mixture by a per se known process. If desired, these products may be purified by way of per se conventional means, e.g. recrystallization or chromatography.

Accordingly, the objective compound of the present invention is normally recovered from the reaction mixture in which it exists either as the free acid or the salt thereof. If desired, the salts may be converted by conventional metathetic reactions to other salts.

It should be noted that the penicillins of the general formula (I) are characterized by at least two acidic functional groups, i.e., the carboxyl and sulfo moieties. Because of the difference in the relative degree of acidity of these acid groups, it is possible to prepare either an acid salt or a normal salt.

Among the penicillins (I), when $R_1$ represents a different group than $R_2$, the $\alpha$-carbon atom of the acyl group constitutes an asymmetric carbon atom, and in such cases there exists two optical isomers, it being understood that all such individual isomeric forms as well as mixtures thereof can be produced in accordance with the process of the present invention. When the acylation products are obtained as a mixture of isomers, if desired, the mixture may be resolved optically into the respective isomers by chromatography or recrystallization according to per se known procedures. Alternatively, the optically active penicillins are produced by employing an optically active acylating agent derived from a resolved carboxylic acid of the general formula (II). The optical resolution of the carboxylic acid is carried out by per se known means, e.g. recrystallization of an optically active basic (e.g. brucine, quinine) salt of the carboxylic acid.

As stated hereinabove, the penicillins produced by the present invention exhibit strong antibacterial activities against Gram-negative bacteria and penicillin G-resistant strains as well as against common Gram-positive bacteria. The following test demonstrates the peculiar antibacterial activities of typical compounds of the present invention, i.e.

A. D- and DL-α-sulfobenzylpenicillin (disodium salts), in terms of minimum inhibitory concentration (MIC; microgram/milliliter) against a variety of bacteria, in comparison with commercially available synthetic penicillins, i.e.

B. Ampicillin sodium salt
C. Hexacillin
D. Hafcillin sodium salt
E. Dicloxacillin sodium salt

| Tested penicillins | (A) | | (B) | (C) | (D) | (E) |
|---|---|---|---|---|---|---|
| Opt. | D | DL | D(−) | | | |
| Pseudo. aerugino. | 13 | 20 | >100 | >100 | >100 | >100 |
| Escherichia coli | 20 | 20 | 20–50 | 100 | >100 | >100 |
| Proteus vulgaris | 1 | 2 | 5 | 20 | >100 | >100 |

—Continued

| Tested Penicillins | (A) | (B) | (C) | (D) | (E) |
|---|---|---|---|---|---|
| Optical Form | D | DL | D(−) | | |
| *Proteus morganii* | 2 | 5 | 100 | 50 | >100 | >100 |
| *Proteus mirabilis* | 0.5 | 2 | 5 | 20 | >100 | >100 |
| *Staphylococcus aureus* | 0.5 | 2 | <0.2 | <0.2 | <0.2 | 0.1 |
| *Bacillus subtilis* | 0.1 | <0.2 | <0.2 | 0.2 | 0.5 | 0.1 |
| *Staphylococcus aureus* (penicillin G-resistant strain) | 10 | 20 | >100 | 100 | <1 | <1 |
| resistance (%)* against *Bacillus cereus* penicillinase | 66 | 57 | 0 | 0 | 76 | 90 |

*Remaining potency in percentage terms after a mixture of 0.5 milliliter of an aqueous penicillinase solution (0.1 milligram/milliliter) and 0.5 milliliter of an aqueous solution of the penicillin (2 milligram/milliliter) was kept at 34°C for 30 minutes.

It is apparent from the foregoing Table that the typical compound (A) of this invention exhibits superior results in terms of the minimum inhibitory concentration. For example, against Pseudomonas aeruginosa, the MIC for the D-form of (A) was 10 micrograms/milliliter whereas the MIC values for (B), (C), (D) and (E) were all greater than 100 micrograms/milliliter.

The penicillins produced in the present invention have a very low toxicity towards mammalian species and are well-tolerated even at a large dosage. They can be administered orally in capsules or tablets as well as parenterally in solutions or suspensions. For example, in the treatment of pseudomonas infections in mammals such as mice, man or the like, the penicillins are administered with conventional procedures in an amount of from about 5 to 50 mg./kg. body weight/day, but usually about 10 to about 30 mg./kg. body weight/day, in divided dosages, e.g. two to four times a day.

The following examples will serve to illustrate the present invention without being limited thereto. In these examples, the parts are by weight and bear the same relationship to parts by volume as do grams to milliliters. The infrared absorption spectrum (IR) is expressed in terms $\nu_{max}^{KBr}$ cm$^{-1}$, and the nuclear magnetic resonance spectrum (NMR) is expressed in terms of $\delta$ (in D$_2$O, 60MC). The abbreviations s., d., t., q. and m. mean that the bands are apparent singlet, doublet, triplet, quartet and multiplet.

EXAMPLE 1

To a suspension of 1.08 parts by weight of 6-aminopenicillanic acid in 8 parts by volume of water is added 1.48 parts by weight of sodium bicarbonate. After the mixture is dissolved, a solution of 1.18 parts by weight of α-sulfophenylacetyl chloride in 10 parts by volume of diethylether is gradually added thereto. The mixture is stirred at a temperature in the neighborhood of 0° C for 1 hour. The aqueous layer is washed twice with 10 parts by volume of portions of ether and adjusted to pH 1.2 with cation exchange resin of polystyrene sulfonic acid type under constant cooling. Then the solution is washed twice with 15 parts by volume of portions of ethyl acetate, followed by extraction twice with 15 parts by volume of portions of n-butanol. The extracts are combined and washed twice with 15 parts by volume of portions of water and, then, extracted with an aqueous solution of sodium bicarbonate. The extract is adjusted to pH 6.5, washed with ether and lyophilized to give the sodium salt of α-sulfobenzylpenicillin. Yield is 1.2 parts by weight. Upon recrystallization from water-acetone, the compound shows:

Elementary analysis as $C_{16}H_{16}N_2O_7S_2Na_2 \cdot 3H_2O$
Calculated C, 37.50; H, 4.29; N, 5.48; S, 12.50
Found C, 37.49; H, 4.15; N, 5.58; S, 12.25
IR: 3,000 (phenyl CH str.), 1770 lactam C=O), 1675 (—CONH—), 1615 (—COO—), 1530, 1405, 1325, 1210, 1050 (—SO$_3^-$), 700
NMR: 1.60 (6H, t.), 4.32 (1H, d.), 5.16 (1H, s.), 5.64 (2H, d.), 7.56 (5H, diffused s.).

6 parts by weight of optically resolved D-α-sulfophenylacetic acid ($[\alpha]D = -23.9°$ (C = 2.0, H$_2$O)) are treated by the same procedure as above, and 6.2 parts by weight of D-α-sulfobenzylpenicillin are obtained. $[\alpha]D = +146.0°$ (C = 1.0, H$_2$O).

EXAMPLE 2

To a suspension of 3.01 parts by weight of 6-aminopenicillanic acid in 25 parts by volume of dry chloroform is added 2.24 parts by weight of hexamethyl disilazane. After refluxing for 1.5 hours on a water bath at 78° C, the solvent is distilled off from the clear reaction mixture under reduced pressure at 40° C to leave trimethylsilyl N-trimethylsilyl-6-aminopenicillanate.

The residue is dissolved in 50 parts by weight of chloroform which was purified by distillation in the presence of phosphorus pentoxide, and 1.2 parts by weight of triethylamine is added thereto at −3° C. To the solution 2.6 parts by weight of α-sulfophenylacetyl chloride is added dropwise under stirring at −3° C, the addition taking about 20 minutes. The stirring is continued for an additional 30 minutes at 0° C. The reaction mixture is washed with cold water, and the organic layer is extracted with an aqueous sodium bicarbonate solution (pH 6.5). The extract is washed with ether, and is lyophilized to give the sodium salt of α-sulfobenzylpenicillin, which is identified to be the product of Example 1.

EXAMPLE 3-18

The following penicillins of the general formula

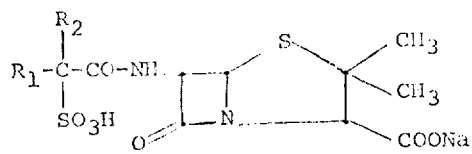

are prepared from 6-aminopenicillanic acid by way of the corresponding acid halide in accordance with the procedures in Example 1 (referred to as Procedure A) and/or in Example 2 (referred to as Procedure B):

3. α-Sulfo-p-nitrobenzylpenicillin

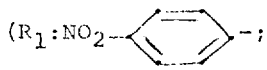

$R_2$:H);
Procedure: A
IR: 3000 (phenyl, —CH—, st.), 1770 (C=O), 1675 (—CO—NH—), 1530, 1350 (—NO$_2$), 1050 (—SO$_3$—)
NMR: 1.60 (6H, t.), 4.25 (1H, broad S.), 5.12 (1H, S.), 5.65 (2H, d.), 7.84 (2H, d.), 8.27 (2H, q.)

4. α-Sulfo-o-carboxybenzylpenicillin ($R_1$: H;

Procedure: A
IR: 3450 (—OH), 2990 (—CH—, st.), 1770 (C=O), 1675 (—CO-NH—), 1610 (—COO—), 1530, 1350 (—NO$_2$), 1050 (—SO$_3$)

5. α-Sulfo-naphthylmethylpenicillin

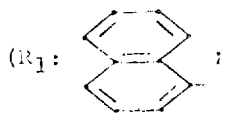

$R_2$: hydrogen;
Procedure: A, B
IR: 3350 (—OH), 3070, 3000 (—CH—), 1770 (C=O) 1670 (—CO—NH—), 1615 (—COO$^-$), 1515, 1400, 1325, 1210, 1125, 1045 (—SO$_3^-$), 830, 790, 770, 700

6. α-Sulfo-o-methoxybenzylpenicillin ($R_1$: H;

Procedure: A, B
IR: 3335 (—OH), 3000 (—CH—), 1780(C=O), 1610 (COO$^-$), 1500, 1402, 1042 (—SO$_3^-$)

7. α-Sulfo-5-sulfo-2-thienylmethylpenicillin

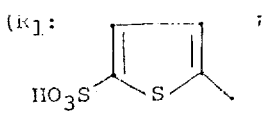

$R_2$: H);
Procedure: A
IR: 3450 (OH), 2950 (—CH=), 1760 (C=O), 1690 (—CONH—), 1605 (—COO$^-$), 1235, 1043 (—SO$_3^-$)

8. α-Sulfo-ethylpenicillin ($R_1$: H; $R_2$: CH$_3$—);
Procedure: A, B
IR: 3450 (broad, —OH), 2980 (—CH), 1770 (C=O), 1670 (—CONH—), 1651 (—COO—), 1460, 1400, 1200 (broad), 1049 (—SO$_3$—)

9. α-Sulfo-n-pentylpenicillin ($R_1$: CH$_3$(CH$_2$)$_3$—; $R_2$: H);
Procedure: A, B
IR: 3420 (—OH), 2980, 2850 (—CH—), 1770 (C=O), 1670 (—CONH—), 1615 (—COO$^-$), 1470, 1410, 1220 (broad), 1052 (—SO$_3^-$)
NMR: 0.98 (3H, t.), 1.2-1.35 (6H, m.), 1.60 (3H, s.), 1.71 (3H, s.), 3.68, 3.90 (1H, t.), 4.26, 4.35 (1H), 5.50-5.72 (2H, m.)

10. α-Sulfo-n-undecylpenicillin ($R_1$: CH$_3$(CH$_2$)$_9$—; $R_2$: H);
Procedure: A, B
IR: 3370 (—OH), 2920, 2840 (—CH—), 1765 (C=O), 1665 (—CONH—), 1612 (—COO$^-$), 1050 (—SO$_3^-$)
NMR: 0.92 (3H), 1.33 (16H, broad s.), 1.59 (3H, s.), 1.68 (3H, s.), 3.65, 3.87 (1H, t.), 4.23, 4.30 (1H), 5.59 (2H, m.)

11. α-Sulfo-p-chlorobenzylpenicillin ($R_1$: H;

Procedure: A, B
IR: 3360 (broad, —OH), 2950 (—CH—), 1760 (C=O), 1670 (—CO—NH—), 1610 (—COO$^-$), 1490, 1408, 1320, 1240, 1210, 1091, 1047 (—SO$_3^-$), 1015
NMR: 1.49, 1.55, 1.63 (6H, t.), 4.25, 4.28 (1H, d.), 5.11 (1H, s.), 5.55, 5.61 (2H, d.), 7.50, 7.52 (4H, d.)

12. α-Sulfo-cyclohexylmethylpenicillin

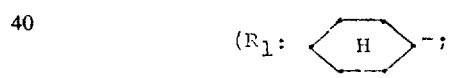

$R_2$: H);
Procedure: A, B
IR: 3420 (—OH), 2980 (—CH), 1770 (C=O), 1680(Shoulder), 1612 (—COO$^-$), 1410, 1210-1250 (broad), 1051 (—SO$_3^-$)

13. α-Sulfo-phenethylpenicillin

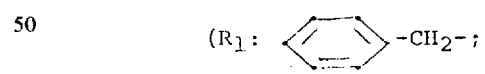

$R_2$:H);
Procedure: A, B
IR: 3390 (—OH), 1765 (C=O), 1670 (—CO—NH—), 1610 (—COO$^-$), 1250-1210, 1043 (—SO$_3^-$)
NMR: 1.53, 1.58 (3H, d.), 1.62, 1.68 (3H, d.), 3.42 (2H, m.), 4.22 (1H, s.), 4.20 (1H, s.), 5.42, 5.55 (2H, q.), 7.39 (5H, s.)

14. α-Sulfo-p-methylbenzylpenicillin

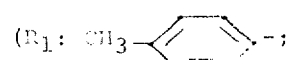

$R_2$: H);
Procedure: A, B
IR: 3400 (—OH), 2980, 2940 (—CH—), 1765

(C=O), 1672 (—CONH—), 1612 (—COO⁻), 1250–1215, 1050 (—SO₃⁻)
NMR: 1.51, 1.55, 1.63 (6H, t.), 2.35 (3H, s.), 4.26, 4.30 (1H, d.), 5.06 (1H, s.), 5.56, 5.60 (2H, d.), 7.28, 7.48 (4H, q.)

15. α-Sulfo-cyclohexylpenicillin (R₁ and R₂, taken together,: —(CH₂)₅—);
Procedure: A, B
IR: 3420 (—OH), 2950 (—CH—), 1770 (C=O), 1664 (—CONH—), 1610 (—COO⁻), 1045 (SO₃⁻)
NMR: 0.7–1.54 (10H, m.), 1.68, 1.70 (3H, d.), 1.61 1.65 (3H, d.), 4.33 (1H, s.), 5.63 (2H, d.)

16. α-Sulfo-p-cyclohexylbenzylpenicillin (R₁: ⟨H⟩—⟨ ⟩ ;

R₂:H);
Procedure: A, B
IR: 3420 (—OH), 1770 (C=O), 1660 (—CO—NH—), 1615 (—COO⁻), 1410 (—CH—), 1250–1215, 1046 (—SO₃⁻)

17. α-Sulfo-2,4-dichlorobenzylpenicillin (R₁: Cl—⟨ ⟩—; R₂ : H);

Procedure: A, B
IR: 3410 (—OH), 2980, 2920 (—CH), 1768 (C=O), 1675, 1618 (—COO⁻), 1515, 1475, 1407, 1325, 1220–45 (broad), 1045 (—SO₃⁻)
NMR: 1.49 (3H, s.), 1.58 (3H, s.), 4.26 (1H, s.), 5.54 (1H, s.), 5.60, 5.70 (2H, d.), 7.3–8.02 (3H, m.)

18. α-Sulfo-p-fluorobenzylpenicillin (R₁: F—⟨ ⟩—;

R₂: H);
Procedure: A
IR: 3400(OH), 2960(—CH—), 1765(β-lactum), 1670(—CONH—), 1609(—COO⁻), 1225(—SO₂—), 1045(—SO₃⁻)
NMR: 1.53, 1.57, 1.65(6H, t.), 4.28, 4.31(1H, d.), 5.16(1H, s.), 5.57, 5.62(2H, d.), 6.95–7.85(4H, m.)

What is claimed is:

1. A method for combatting bacterial infections which comprises administering to a patient infected with the bacteria an antibacterially effective amount of a compound of the formula $$R_1-\underset{\underset{SO_3H}{|}}{\overset{\overset{R_2}{|}}{C}}-CO-NH-\begin{bmatrix}\text{β-lactam}\end{bmatrix}-COOH$$

wherein $R_1$ and $R_2$ are selected from the group consisting of hydrogen, alkyl having 1–12 carbon atoms, cycloalkyl having 3–12 carbon atoms, aralkyl having 7–10 carbon atoms and substituted and unsubstituted phenyl, pyridyl, naphthyl or thienyl, the substituent being one or more members selected from the group consisting of nitro, sulfo, carboxyl, halo, lower alkyl, lower alkoxy and cycloloweralkyl, or $R_1$ and $R_2$ together represent polymethylene having 4–6 carbon atoms, or a pharmaceutically acceptable salt thereof.

2. The method according to claim 1, wherein the compound or its salt is administered parenterally.

3. The method according to claim 1, wherein the compound or its salt is administered in an amount of 5–50 mg./kg./day.

4. The method according to claim 3, wherein the compound is administered in an amount of 10–30 mg./kg./day.

5. The method according to claim 1, wherein the bacteria is Pseudomonas.

6. The method according to claim 1, wherein the compound administered is α-sulfobenzylpenicillin or its pharmaceutically acceptable salt.

7. The method according to claim 6, wherein the compound administered is the disodium salt of α-sulfobenzylpenicillin.

8. The method according to claim 1, wherein the compound administered is the D-isomer of α-sulfobenzylpenicillin or its pharmaceutically acceptable salt.

9. The method according to claim 8, wherein the compound administered is the D-isomer of the disodium salt of α-sulfobenzylpenicillin.

10. A method for combatting bacterial infections which comprises administering to a patient infected with gram-negative bacteria an antibacterially effective amount of α-sulfobenzylpenicillin or a pharmaceutically acceptable salt thereof.

11. A method for combatting bacterial infections which comprises administering to a patient infected with Pseudomonas bacteria an antibacterially effective amount of α-sulfobenzylpenicillin or a pharmaceutically acceptable salt thereof.

12. A method for combatting bacterial infections which comprises administering to a patient infected with Pseudomonas bacteria an antibacterially effective amount of α-sulfobenzylpenicillin disodium salt.

* * * * *